United States Patent

Bamford et al.

Patent Number: 5,431,951
Date of Patent: Jul. 11, 1995

[54] PROCESSING OF MALTODEXTRINS

[75] Inventors: Philip C. Bamford, Knebworth; Thomas R. Kelly, Kettering; Anthony Morrison, Bedford; Penelope E. Smith, Raunds, all of England

[73] Assignee: Unilever Patent Holdings BV, Vlaardingen, Netherlands

[21] Appl. No.: 121,467

[22] Filed: Sep. 16, 1993

[30] Foreign Application Priority Data

Sep. 16, 1992 [GB] United Kingdom ............... 9219552

[51] Int. Cl.⁶ ........................................... A23L 1/0522
[52] U.S. Cl. ................................. 426/658; 426/578; 426/602; 426/603; 426/573
[58] Field of Search ............... 426/658, 602, 603, 578, 426/573

[56] References Cited

U.S. PATENT DOCUMENTS

| | | | |
|---|---|---|---|
| 3,962,465 | 6/1976 | Richter et al. | 426/48 |
| 4,536,408 | 8/1985 | Morehouse et al. | 426/658 |
| 4,861,604 | 8/1989 | Tang et al. | 426/94 |
| 4,917,915 | 4/1990 | Cain et al. | 426/602 |
| 4,956,193 | 9/1990 | Cain et al. | 426/602 |
| 5,252,352 | 10/1993 | Banach et al. | 426/603 |

FOREIGN PATENT DOCUMENTS

| | | | |
|---|---|---|---|
| 193378 | 3/1978 | European Pat. Off. | |
| 0149258 | 7/1985 | European Pat. Off. | A23L 1/195 |
| 298561 | 1/1989 | European Pat. Off. | |
| 0566428 | 10/1993 | European Pat. Off. | A23G 3/00 |
| 2229077 | 9/1990 | United Kingdom. | |
| WO9101091 | 2/1991 | WIPO | A23L 1/0522 |
| WO9202147 | 2/1992 | WIPO | A23L 1/05 |

*Primary Examiner*—Jeanette Hunter
*Attorney, Agent, or Firm*—Cushman Darby & Cushman

[57] ABSTRACT

A method of treating maltodextrin by adding a seed material to an aqueous solution of a maltodextrin having a DE not exceeding about 6 and that is heated to a temperature of at least 70° C. Addition of a seed material promotes aggregate formation and so promotes gelling, resulting in production of a firmer gel than conventionally obtainable.

The invention also provides a method of treating maltodextrins by maintaining an aqueous solution or dispersion of maltodextrin having a DE not exceeding about 6 (e.g. Paselli SA2) at a temperature of less than 50° C. for at least 1 hour; then heating the solution or dispersion to a temperature of at least 70° C.; followed by cooling. Maltodextrin treated in this way forms a gel that is firmer in consistency than maltodextrin gels produced by conventional processes.

33 Claims, 1 Drawing Sheet

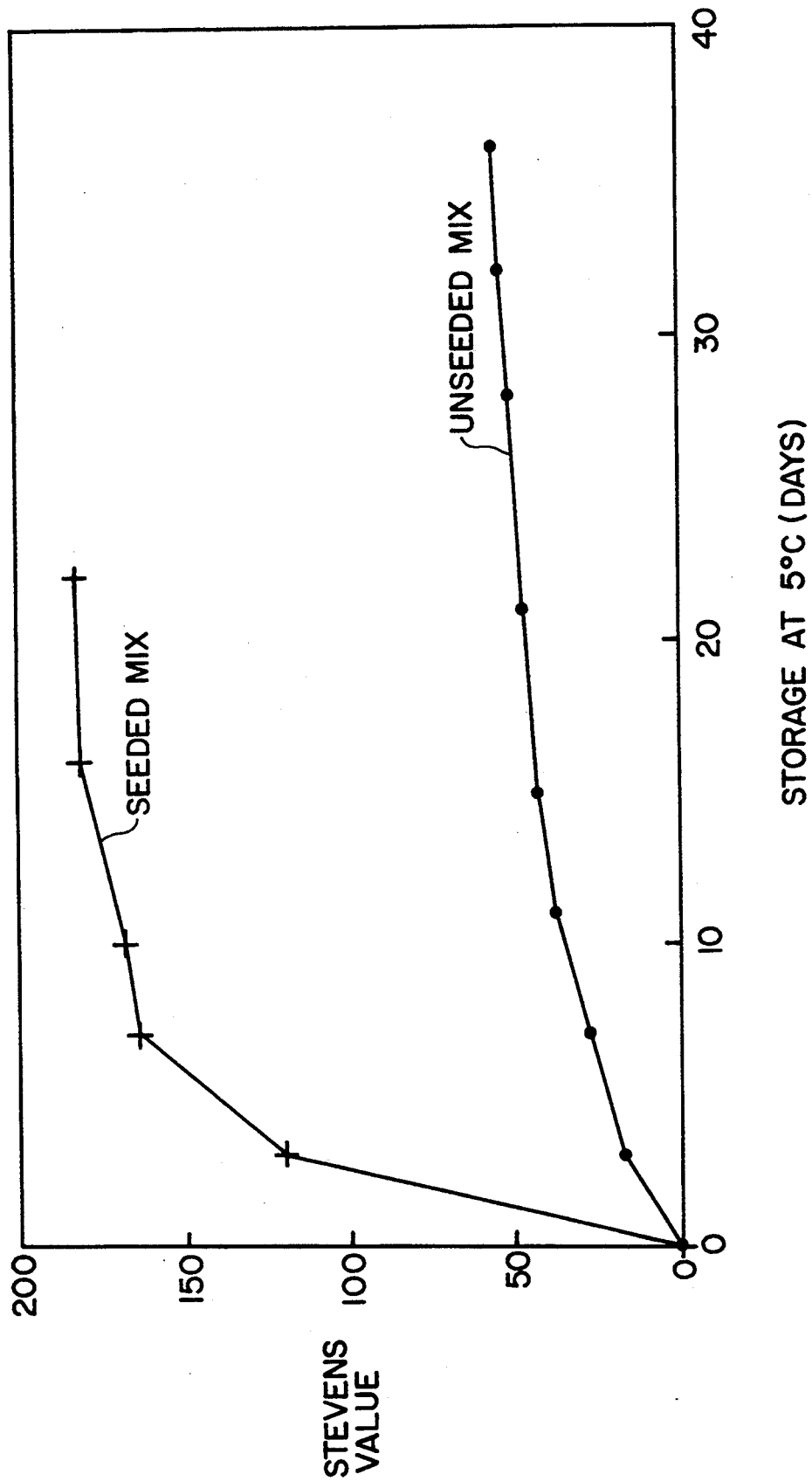

PROCESSING OF MALTODEXTRINS

FIELD OF INVENTION

This invention concerns processing of maltodextrins. Maltodextrins are a range of products of hydrolysis of starch which can be defined by their dextrose equivalence (DE), which is a number between 0 and 100 representing the number of reducing end groups per 100 anhydro dextrose units, the greater the degree of hydrolysis the higher the DE value. The present invention is concerned with processing of maltodextrins having a relatively low DE value, generally not exceeding about 6.

BACKGROUND OF THE INVENTION

It is known to use certain maltodextrins as gel-forming materials in the production of low and no fat edible spreadable products. See, for example, EP 0298561 and EP 92301955.8. In a typical process a 12% dispersion of the maltodextrin known by the Trade Mark Paselli SA2 (which is an enzymatically degraded potato starch having a DE value of about 2) in cold water is heated to about 90° C. and held at that temperature until the Paselli dissolves (about 10 minutes). The solution is then cooled to about 60° C. and gelatin (and possibly also other ingredients such as sodium chloride, potassium sotbate, milk and fat) added. On cooling to ambient temperature a spreadable edible plastic dispersion is obtained, e.g. in the form of a low fat butter or margarine substitute.

The present invention concerns treatment of maltodextrins with the aim of improving their gel-forming behaviour.

SUMMARY OF THE INVENTION

In a first aspect, the invention provides a method of treating maltodextrin, comprising adding a seed material to an aqueous solution of a maltodextrin having a DE not exceeding about 6 and that is heated to a temperature of at least 70° C.

Addition of a seed material promotes aggregate formation and so promotes gelling, resulting in production of a firmer gel than conventionally obtainable, with the benefits noted above.

It is thought desirable for the seed material to have or to mimic the structure of alpha-D-(1-4) glucan chains. There are many possible sources of suitable seed materials including the following:

a) Cold or hot solutions of maltodextrins.
b) Structured amylose, e.g. retrograded amylose from native cereal, pulse or root/tube starches e.g. corn (maize), wheat, rice, high amylose corn, sago, tapioca, bean etc. These are conveniently obtained by heating the starch to a temperature of about 90°-100° C. then cooling.
c) Native starch granules, e.g. from sources as in b).
d) Preparations of purified or separated amylose or similar materials, e.g. potato amylose.
e) Amylose from high amylose starches.
f) Any degraded starch including alpha-D-(1-4) glucan chains long enough to form helical structures.

For a) it is convenient to use a solution or dispersion of about 20% maltodextrin by weight, with the solution being processed in one of the following ways:

i) The solution or dispersion can be freeze dried and the freeze dried maltodextrin pulverised to form a seed material.
ii) The solution or dispersion can be allowed to stand at a temperature not exceeding about 15° C. for a period of hours, e.g. overnight, and the resulting precipitate removed. The precipitate can be used as a seed material either wet or after air drying.
iii) The solution or dispersion can be allowed to stand at a temperature not exceeding about 15° C. for a period of hours, e.g. overnight, and the resulting slurry used as a seed material without further treatment.

The seed material is conveniently added in an amount in the range 0.5 to 10%, preferably 1 to 5%, by weight as a % of the weight of maltodextrin. The maltodextrin solution is preferably heated to a temperature of about 85° C.

The maltodextrin solution may be heated prior to addition of the seed material but this is not essential and instead heating can take place at a later stage, e.g. at pasteurisation.

The maltodextrin preferably has a DE of less than 4 and typically comprises Paselli SA2.

The resulting gel can be used in the production of edible viscous or spreadable products, such as dressings, dips, savour and sweet spreads, e.g. cheese and chocolate spreads, dairy desserts, low fat peanut butters, cold sauces, and is of particular importance in connection with the preparation of low or zero fat spreads, for example as disclosed in EP 298561 and EP 92301955.8.

In a second aspect the present invention provides a method of treating maltodextrins, comprising maintaining an aqueous solution or dispersion of maltodextrin having a DE not exceeding about 6 at a temperature of less than 50° C. for at least 1 hour; then heating the solution or dispersion to a temperature of at least 70° C.; followed by cooling.

Maltodextrin treated in this way forms a gel that is firmer in consistency than maltodextrin gels produced by conventional processes, as described above. By using the method of the invention it is thus possible to produce a maltodextrin gel of given consistency using less maltodextrin than is required in conventional processes, with consequential benefits in the form of reduction of calorific content of the product, reduced cost of ingredients, and enhanced flavour due to reduction of possibly undesirable flavour associated with maltodextrins.

The maltodextrin solution or dispersion conveniently comprises between 6 and 20%, preferably between 8 and 12%, by weight maltodextrin in water.

The maltodextrin preferably has a DE of less than 4 and typically comprises Paselli SA2.

When using Paselli SA2, it is found that using a solution of about 9% by weight results in a gel of comparable consistency to a gel produced from a 12% solution by the conventional methods discussed above.

The initial temperature is preferably in the range 5° to 10° C., with the initial temperature preferably being maintained for at least 2½ hours, typically about 12 hours. This is conveniently achieved by maintaining the solution or dispersion at room temperature or in a refrigerator overnight.

The solution or dispersion is then heated to a temperature that is preferably in the range 80° to 90° C., typically 85° C. This elevated temperature is desirably maintained for at least a few seconds but may be held for longer times e.g. about 10 minutes.

The starting material can either be a freshly made solution or dispersion (as described above), or else a solution or dispersion previously heated to a temperature of at least 70° C., preferably about 85° C., for at least a few seconds but possibly held at such elevated temperature for longer, e.g. about 10 minutes, and then cooled to between 0° C. and 50° C., preferably about 5° C. for a period of time, typically about 12 hours.

Final cooling to ambient temperature or below is conveniently carried out using a scraped surface heat exchanger (or votator), sometimes also referred to as an A unit.

The method of the invention finds application in processing of maltodextrins for use in preparation of edible viscous or spreadable products, as described above in connection with the first aspect of the invention.

For production of low and no fat spreads, e.g. as disclosed in EP 298561 and EP 92301955.8, after being heated to a temperature of at least 70° C., the maltodextrin solution is conveniently cooled to a temperature of about 60° C. and gelatin (and any other ingredients) added, followed by a conventional processing.

Alternatively, the starting material may comprise a mixture of maltodextrin, gelatin (and possibly other ingredients), or possibly even an edible plastics dispersion produced by conventional processing.

The first and second aspects of the invention can be used separately or in combination.

The invention also includes within its scope maltodextrin treated by one or both methods of the invention, and edible viscous or spreadable products incorporating such maltodextrin.

The invention also provides aqueous maltodextrin gel having a ratio of yield stress to maltodextrin weight concentration greater than 0.05.

The invention will be further described, by way of illustration, in the following Examples and by reference to the accompanying drawings, in which:

FIG. 1 is a graph of storage time at 5° C. in days versus Stevens value of products produced by the method of the invention, showing structure formation in water continuous spreads and the effect of seeding on setting rates.

The following examples concern work carried out using Paselli SA2, ranging from initial observations on Paselli SA 2-water systems, through aqueous phase formulations comprising Paselli SA2, gelatin (270 or 250 Bloom), sodium chloride, and potassium sotbate (generally as described in EO 298561), to full formulation products (comprising aqueous phase as mentioned above plus milk and fat) made on both microscale (3 to 10 l per hour) and pilot plant scale (100 l per hour).

Products were evaluated by a number of theological tests, as follows:
a) Cartimed Rheometer—ramped shear stress—measured shear strain (rate). The measured yield stress is quoted in Pa. Measurement temperature is 5° C.
b) Instron Materials Tester—a cylinder of material is crushed. The mean modulus (MPa), mean yield stress (MPa), and mean yield strain (deformation at yield stress) (%) are quoted.
d) Stevens Value—Direct measurement of 'gel strength' on product in pot. Units are arbitary.

In general the yield stress measurement (Cartimed) is used to monitor the early stages of gel setting, the Instron gives an overall picture of mechanical properties of the final product and the Stevens is a quick test for gel strength used over days and weeks of the product life.

EXAMPLE 1

Paselli SA2 Without Other Ingredients (Seeds Not Isolated)

Aqueous solutions of Paselli SA2 at a concentration of 12% (by weight) were made as shown below using a silverson mixer.
a) A slurry/solution was held at room temperature overnight and heated to 85° C. the following day.
b) A solution was made in conventional manner, involving heating to 85° C. for 10 minutes. The solution was then cooled to below 15° C., held at that temperature overnight and reheated to 85° C. for about 10 minutes the following day.

For comparison purposes a control product was made in conventional manner, involving heating to 85° C. for 10 minutes, followed by cooling.

The yield stress of the resulting products was measured using a Cartimed Rheometer after different time intervals, and the results are given below.

| | Carrimed Rheometer | | | | |
| --- | --- | --- | --- | --- | --- |
| | Days (Yield stress, Pa) | | | | |
| Method | 2 | 9 | 16 | 23 | 30 |
| Control | 1.0 | 0.2 | 0.12 | 0.05 | 1.71 |
| a) (Slurry) | 44 | 105.5 | 176 | 166 | 188.5 |
| b) (Re-heat) | 203.5 | 362 | 528 | 499 | 547 |

EXAMPLE 2

Aqueous Phase Without Milk Protein

A first, control sample was made by making a solution of 12% Paselli SA2, 3% gelatin (Bloom 270), 0.13% potassium sorbate and 1% sodium chloride, heating the mixture to 85° C. for 10 minutes, followed by shearing and cooling by votating in two scraped surface heat exchangers (A units) to obtain an exit temperature of about 0° C.

A second sample was prepared in similar manner to the control sample. However, the product was maintained at room temperature overnight and re-heated to 85° C. for 10 minutes the next day.

The properties of the resulting products were measured after different time intervals, and the results are given below.

| | Carrimed Rheometer | | | |
| --- | --- | --- | --- | --- |
| | Days (Yield stress, Pa) | | | |
| Method | 1 | 7 | 14 | 21 |
| Control | 277.6 | 526.6 | 692 | — |
| Double Heated | 732 | 1562 | 2007 | 1998 |

| | Instron (measured at 28 days) | | |
| --- | --- | --- | --- |
| | Mean Mod.* (Mpa) | Mean Yield Stress (MPa) | Mean Yield Strain (%) |
| Control | $4.79 \times 10^{-2}$ | $5 \times 10^{-3}$ | 12.6 |
| Double Heated | $1.59 \times 10^{-1}$ | $2 \times 10^{-2}$ | 13.7 |

*Mean Mod is an abbreviation of Mean Modulus.

EXAMPLE 3

Paselli SA2 Without Other Ingredients (Seeds Isolated)

A cold slurry/solution (20%) of Paselli SA2 was prepared by disperson in water, either at room temperature or chilled, followed by one of the following treatments:
  i) Freeze dry the solution and pulverise the freeze dried maltodextrin.
  ii) Remove the precipitate formed by standing overnight at below 10° C. and use either wet or after drying.
  iii) Freeze the slurry (−18° C.) overnight
  iv) Use the slurry as formed overnight without further treatment.
  v) Filter or centrifuge slurry and separate seeds from supernatant.

Any of the materials from i) ii) iii) iv) or v) may be used to 'seed' a solution of Paselli SA2 at 85° C. The amount of seed can be from 0.1% to 50% preferably 2 to 6% of the total maltodextrin.

The materials were used as seeds in the following way.

Solutions of 12% Paselli SA2 (5.6% (i.e. 0.67% on product) of the Paselli SA2 as seeds), 0.13% potassium sorbate and 1% sodium chloride were made and heated to 85° C. for 10 minutes, seed material was added (except in the control), and the solutions were then sheared and cooled by votating using two A units to obtain an exit temperature of about 0° C.

The yield stress of the resulting products was measured after different time intervals, and the results are given below:

| | Carrimed Rheometer Yield Stress (Pa) | | | |
|---|---|---|---|---|
| Method/Days | 1 | 7 | 14 | 21 |
| Control (without seeds) | 0.05 | 8 | 10 | 25 |
| Freeze dried materials as seeds (i) | 168.3 | — | 558.3 | 571.6 |
| Air dried materials as seeds (ii) | 82.91 | — | 388.9 | 429.9 |
| Frozen slurry as seeds (iii) | 20 | 100 | 120 | 140 |
| slurry as seeds (iv) | 60 | 175 | 190 | 250 |

EXAMPLE 4

Whole Product—Seeded (Microline)

A product was made generally as described in Example 3 but using Paselli SA2 (9%), gelatin (270 Bloom) (3%), whole milk (25%), sodium chloride, (1.0%), potassium sorbate (0.13%) and beta-carotene (0.05%), either using freeze dried seeds (5.6%) obtained as described in Example 3 or without seeds (as a control).

The properties of the resulting products were measured after different time intervals and the results are given below.

| | Carrimed Rheometer | | | |
|---|---|---|---|---|
| | Days (Yield Stress pA) | | | |
| | 1 | 7 | 14 | 21 |
| Control (no seeds) (12% SA2) | — | 278 | 392 | 634 |
| Freeze dried seeds (5.6%) (9% SA2) | 238 | 372 | 597 | 641 |

Instron (measured at 14 days)

| Sample | Mean Modulus MPa | Mean Yield Stress MPa | Mean Yield Strain % |
|---|---|---|---|
| Control | $2.6 \times 10^{-3}$ | $1.4 \times 10^{-3}$ | 44 |
| Freeze dried seeds (5.6%) | $8.5 \times 10^{-3}$ | $2.1 \times 10^{-3}$ | 26 |

EXAMPLE 5

Whole Product—Seeded (Pilot Plant)

Whole product was made generally as described in Example 4, but using Paselli SA2 (12%), gelatin (250 Bloom) (3%), spray dried skimmed milk powder (2%), sodium chloride (1.0%), potassium sorbate (0.13%), beta-carotene (0.05%), with and without seed material.

Gel strength of the resulting products was measured after different time intervals, and the Stevens values obtained are given

| | Stevens Value Day | | | | |
|---|---|---|---|---|---|
| Sample | 3 | 7 | 11 | 15 | 21 |
| Control (unseeded) | 17 | 27 | 37 | 42 | 46 |
| Seeded | 120 | 164 | 168 | 181 | 182 |

The results are also shown graphically in FIG. 1.

EXAMPLE 6

Properties of Seeds—Concentration of Seeds

Seed concentration of 0.5%–41.6% have been investigated with time using the Carrimed rheometer. The seed concentrations are quoted as percentages of Paselli SA2 added as 20% slurry, (obtained as described in Example 3, iv) which has been left overnight at 5° C.

The slurry was added to a Paselli solution (total concentration 12% at 85° C.) (potassium sorbate and salt only present), then cooled and sheared through two A units to about 0° C. The results are given below.

| | Carrimed Rheometer - Yield Stress (Pa) | | | |
|---|---|---|---|---|
| Seed % | Days | | | |
| Concentration | 1 | 7 | 14 | 21 |
| Control (0%) | 0.5 | 2.0 | 10.0 | 25 |
| 0.5% | 0.05 | 10.85 | 17.59 | 25.63 |
| 1.0% | 0.15 | 29.79 | 51.26 | 69.35 |
| 2.0% | 0.2 | 62.56 | 75.38 | 118.6 |
| 5.6% | 60 | 175 | 190 | 250 |
| 16.6% | 120 | 150 | 210 | — |
| 41.6% | 50 | 120 | 170 | — |

EXAMPLE 7

Properties of Seeds—The Effect of Age at a Constant Seed Concentration

Solutions of 20% Paselli SA2 were made, with no shear, and these where then stored at 5° C. for the required time, (0, 2.5 hrs and 7 hrs). Seeding slurries (obtained as described in Example 3, iv) were then added to freshly prepared Paselli SA2 solutions at 85° C. to give a total concentration present of 12% (5.6% as seeds, i.e. 0.67% on final solution).

The yield stress of the resulting products was measured using a Carrimed rheometer after different time intervals, and the results are given below.

| Carrimed Rheometer | |
| --- | --- |
| Age (hrs) | Measured Yield Stress (Pa) |
| 0 | 0.05 |
| 2.5 | 144.8 |
| 7.5 | 175.8 |

EXAMPLE 8

Properties of Seeds—Effect of Shearing Product After Seeding

Products were made generally as described in Example 5 and tested to demonstrate the effect of shearing the solution through 2 scraped surface heat exchanges. It is found shearing has a significant effect on the final gel strength if seeds are present. Total concentration of Paselli SA2 is 12% (seeds 0.67% on final solution).

The Stevens value of the products was measured after different time intervals and the results are given below, in the following table.

S = sheared
U = unsheared, i.e. quiescently cooled at 5° C.

| | Stevens Value Days | | |
| --- | --- | --- | --- |
| % Concentration | 1 | 7 | 14 |
| Control (S) | 0.5 | 2.0 | 10.0 |
| Control (U) | 0.5 | 2.0 | 2.0 |
| 5.6% seeds (S) | 60 | 175 | 190 |
| 5.6% seeds (U) | 15 | 60 | 110 |

EXAMPLE 9

Other Materials Used to Seed Paselli SA2

Products were made generally as described in Example 5 and different materials used as seeds.

The yield stress of the products was measured after different time intervals and the results are given below.

| Carrimed Measured Yield Stress after 6 days (Pa) | |
| --- | --- |
| Control (no seeds) | 1.0 |
| Hylon - high amylomaise starch (0.5%) | 97.24 |
| Perfectamyl MD6 - potato starch (0.5%) | 134.5 |

EXAMPLE 10

Experiments were carried out to compare the ratio of product firmness to maltodextrin content at maltodextrin gels prepared in accordance with the invention with conventionally produced gels. The results are summarized below.

| | Carrimed Rheometer | |
| --- | --- | --- |
| | Yield Stress (Pa) at 14 days | Yield Stress Concentration |
| Paselli SA2 12% unseeded | 0.7 | 0.05 |
| Paselli SA2 12% seeded | 1.7 | 0.14 |
| | Stevens Value 20 days | Stevens Value Concentration |
| Paselli SA2 12% unseeded | 48 | 4.0 |
| Paselli SA2 12% seeded | 180 | 15.0 |

Gels in accordance with the invention have a higher product firmness to maltodextrin concentration ratio than conventionally produced products, this ratio typically being at least 1½ times the value of that for conventional products.

We claim:

1. A method of treating maltodextrin to improve its gel-forming behavior, comprising adding a seed material to an aqueous solution comprising 6 to 20% by weight of a maltodextrin in water having a DE not exceeding about 6 and that is heated to a temperature of at least 70° C., the seed material being added in an amount of 0.5 to 10% by weight based on the weight of the maltodextrin.

2. A method according to claim 1, wherein the seed material has the structure of alpha-D-(1-4) glucan chains.

3. A method according to claim 1, wherein the seed material comprises one or more of the following:
   a) cold or hot solutions of maltodextrins,
   b) structured amylose;
   c) native starch granules;
   d) purified or separated amylose;
   e) amylose from high amylose starches; and
   f) any degraded starch including alpha-D-(1,4) glucan chains long enough to form helical structures.

4. A method according to claim 3, wherein the seed material comprises a solution or dispersion of about 20% maltodextrin by weight processed in one of the following ways:
   i) freeze drying followed by pulverisation;
   ii) removal of precipitate settling out from the solution or dispersion;
   iii) removal of slurry obtained after standing of the solution or dispersion.

5. A method according to claim 1, wherein the seed material is added to an amount in the range 1 to 5% by weight as a % of the weight of maltodextrin.

6. A method according to claim 1, wherein the maltodextrin solution is heated to a temperature of about 85° C.

7. A method according to claim 1, wherein the maltodextrin solution is heated prior to addition of the seed material.

8. A method according to claim 1, wherein the maltodextrin has a DE of less than 4.

9. A method according to claim 8, wherein the maltodextrin comprises Paselli SA2.

10. A method of treating maltodextrins to improve the gel-forming behavior thereof, comprising maintaining an aqueous solution or dispersion comprising 6 to 20% by weight maltodextrin in water, said solution or dispersion having a DE not exceeding about 6 at a temperature of less than 50° C. for at least 1 hour; then heating the solution or dispersion to a temperature of at least 70° C.; followed by cooling.

11. A method according to claim 10, wherein the maltodextrin solution or dispersion comprises between 8 and 12% by weight maltodextrin in water.

12. A method according to claim 10, wherein the maltodextrin has a DE of less than 4.

13. A method according to claim 12, wherein the maltodextrin comprises Paselli SA2.

14. A method according to claim 13, wherein the Paselli SA2 is in the form of a solution of about 9% by weight.

15. A method according to claim 13, wherein the initial temperature of the maltodextrin is in the range 5° to 10° C.

16. A method according to claim 10, wherein the maltodextrin is initially maintained at a temperature of less than 50° C. for at least 2½ hours.

17. A method according to claim 16, wherein the maltodextrin is initially maintained at a temperature of less than 50° C. for about 12 hours.

18. A method according to claim 10, wherein the solution or dispersion is heated to a temperature in the range 80° to 90° C.

19. A method according to claim 18, wherein the solution or dispersion is heated to about 85° C.

20. A method according to claim 10, wherein the temperature of at least 70° C. is maintained for about 10 minutes.

21. A method according to claim 11 wherein the solution or dispersion which is treated is a freshly made solution or dispersion.

22. A method according to claim 10, wherein the solution or dispersion has previously been heated to a temperature of at least 70° C. and then cooled between 0° C. and 50° C.

23. A method according to claim 22, wherein the solution or dispersion has previously been heated to a temperature of about 85° C.

24. A method according to claim 22, wherein the solution or dispersion has previously been heated to a temperature of at least 70° C. for a period of about 10 minutes.

25. A method according to claim 10, wherein the final cooling is carried out using a scraped surface heat exchanger.

26. A method according to claim 10, further comprising adding a seed material to the solution or dispersion of maltodextrin.

27. A method according to claim 1 or 10, wherein after being heated to a temperature of at least 70° C., the maltodextrin solution is cooled to a temperature of about 60° C. and gelatin added, followed by processing in to produce low or no fat spreads.

28. A method according to claim 1 or 10, wherein the aqueous solution or dispersion of maltodextrin forms part of a mixture of maltodextrin and gelatin for production of low or no fat spreads.

29. In a method of producing an edible viscous or spreadable product which includes a maltodextrin, the improvement comprising utilizing, as the maltodextrin, maltodextrin treated in accordance with the method of claim 1 or 11.

30. Maltodextrin treated by the method of any one of claim 1 or 10.

31. Aqueous maltodextrin gel having a ratio of yield stress to maltodextrin weight concentration greater than 0.05.

32. An edible viscous or spreadable product produced by the method of claim 27.

33. An edible viscous or spreadable product including a maltodextrin according to claim 31.

* * * * *